F. C. MILLER.
RIM AND TIRE HOLDER FOR AUTOMOBILES.
APPLICATION FILED MAR. 8, 1913.
1,094,086.
Patented Apr. 21, 1914.
2 SHEETS—SHEET 2.
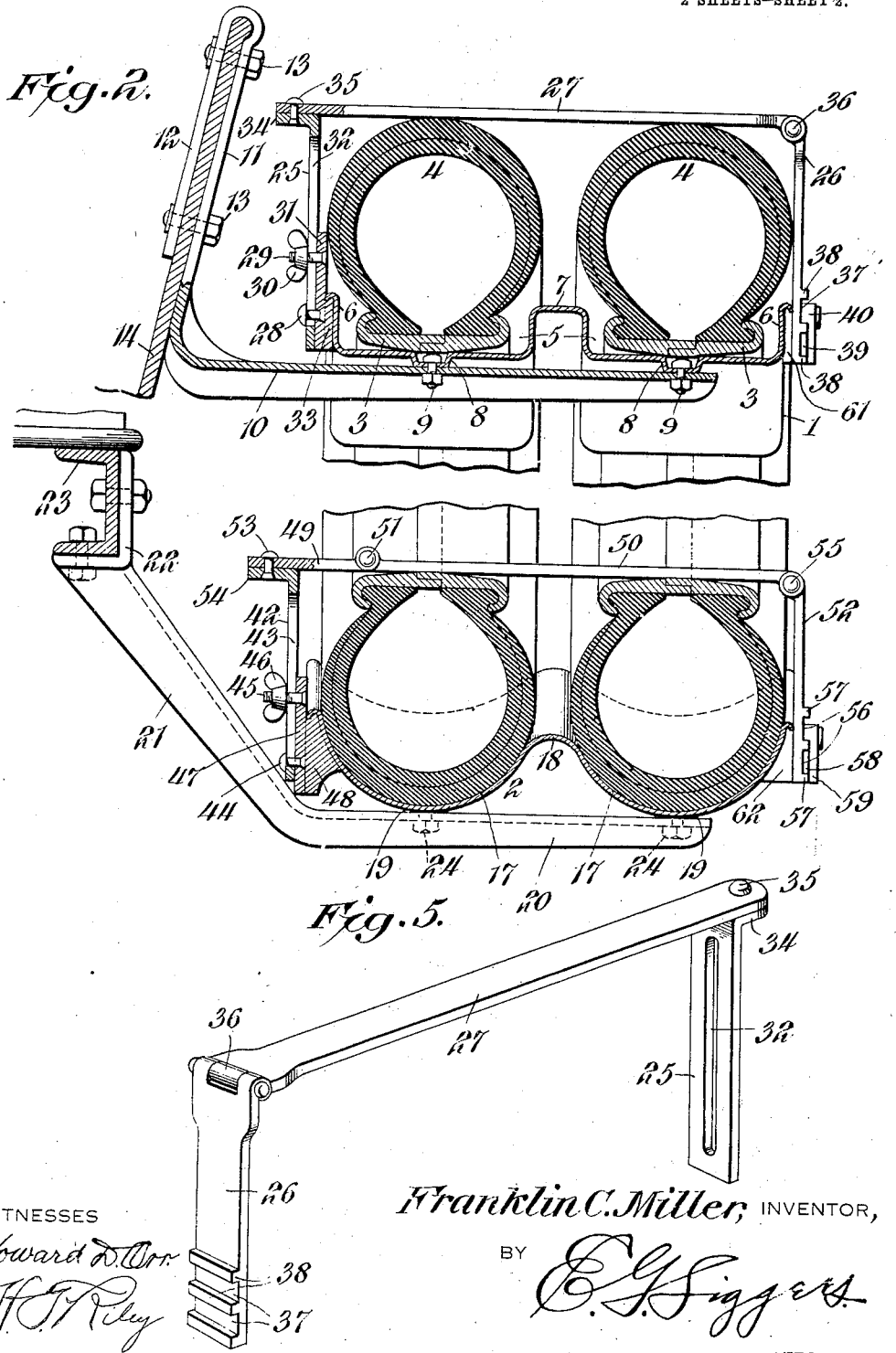
WITNESSES
Franklin C. Miller, INVENTOR,
BY
ATTORNEY.

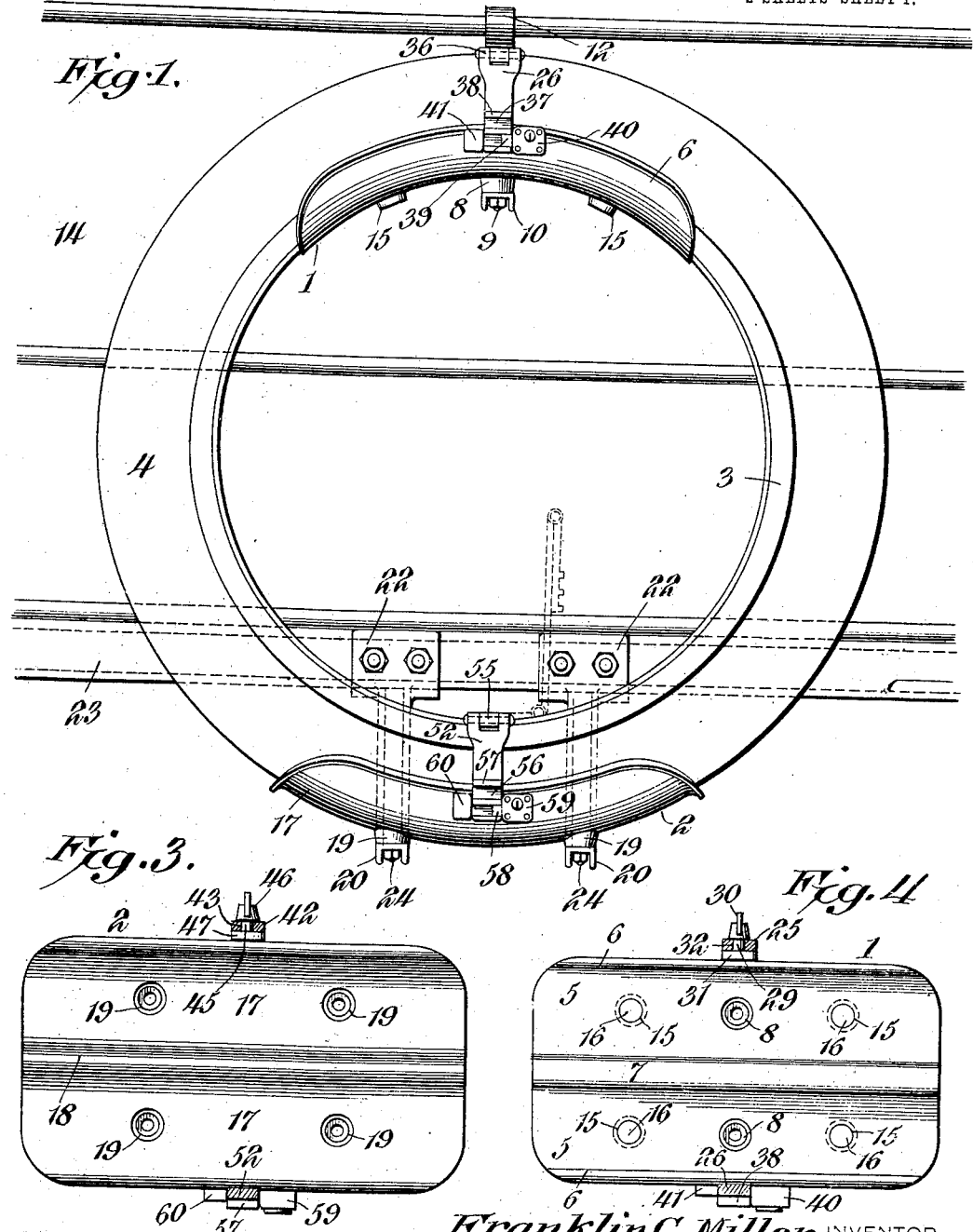

UNITED STATES PATENT OFFICE.

FRANKLIN C. MILLER, OF EASTON, PENNSYLVANIA.

RIM AND TIRE HOLDER FOR AUTOMOBILES.

1,094,086.     Specification of Letters Patent.     Patented Apr. 21, 1914.

Application filed March 8, 1913. Serial No. 753,010.

*To all whom it may concern:*

Be it known that I, FRANKLIN C. MILLER, a citizen of the United States, residing at Easton, in the county of Northampton and State of Pennsylvania, have invented a new and useful Rim and Tire Holder for Automobiles, of which the following is a specification.

The invention relates to improvements in rim and tire holders for automobiles.

The object of the present invention is to improve the construction of rim and tire holders for automobiles, more especially the locking means for confining the tires, and to provide a simple, inexpensive and efficient tire locking means of strong and durable construction, designed for confining the upper and lower portions of the rims and tires on upper and lower supports, and capable of adjustment to enable various styles and sizes of demountable rims and tires to be securely locked on the said supports and of effectually preventing such rims and tires from being removed from the holder until unlocked by a proper key.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an elevation of a rim and tire holder, constructed in accordance with this invention. Fig. 2 is an enlarged central vertical sectional view of the same. Figs. 3 and 4 are detail plan views partly in section, illustrating the construction of the upper and lower supports. Fig. 5 is a detail perspective view of one of the locking devices.

Like numerals of reference designate corresponding parts in all the figures of the drawings.

In the accompanying drawings in which is illustrated the preferred embodiment of the invention, the rim and tire holder comprises in its construction upper and lower supports 1 and 2 and upper and lower locking devices, arching the upper and lower supports and detachably retaining thereon a pair of demountable rims 3 and tires 4. The upper support 1, which is designed to be constructed of pressed steel or other suitable material, is curved longitudinally to present upper convex faces to and conform to the configuration of and provide seats for the upper portions of the rims 3, and its terminals are preferably tapered, as shown. The upper support is provided with spaced parallel grooves 5, receiving the upper portions of the rims and the tires and formed by outer marginal flanges 6, and an arched intermediate longitudinal connecting portion or web 7, interposed between the rims and constituting the inner walls of the curved grooves or seats of the upper support. The upper support is provided at the center of its grooves or seats with downwardly tapered depressions 8, which are seated upon and secured by bolts 9 to a horizontal supporting arm 10 of an upper bracket. The upper bracket consists of the said horizontal arm 10 and an inclined upwardly extending arm 11, having an approximately U-shaped attaching portion 12 formed by bending the metal of the inclined arm on itself and looped over and secured by bolts 13 to the side 14 of a car, as clearly illustrated in Fig. 2 of the drawings. The upper support is also preferably provided at opposite sides of the center with depressions 15 for the reception of cushions 16 of rubber, or any other suitable material projecting above the upper faces of the bottoms of the grooves or seats of the upper support, and receiving and supporting the rims and adapted to prevent the same from being injured by the vibrations incident to an automobile. The lower support, which is also constructed of pressed steel or other suitable material, is curved longitudinally to present an upper concave face to the tires and is bent transversely to form longitudinal grooves 17, which constitute seats for the tires 4, and the grooved portions of the bottom supports are curved transversely to conform to the configuration of the treads of the tires. The said lower support has a central longitudinally disposed raised connecting portion or web 18, approximately inverted U-shaped in cross section and spacing the grooves or seats from each other. The weight of the rims and tires is sustained by the upper support, which thereby relieves the lower portions of the tires of pressure and prevents that deterioration of the rubber, which would result if the bottoms of the tires were subjected to the constant pressure of the weight of the rims and tires. The lower support is provided at opposite sides of the center with depressions 19, arranged in pairs and seated upon horizontal arms 20 of a pair of lower supporting brackets, consisting of the said horizontal arms 20 and upwardly extending inclined arms 21, provided at their upper ends with approximately L-shaped attaching portions 22, which are bolted or otherwise secured to the side beam or frame member 23 of the automobile. The depressions receive the nuts of bolts 24, which pierce the lower support and the horizontal arms of the lower supporting brackets. By securing the upper and lower brackets to a car at different distances apart, the upper and lower supports are adapted to be arranged to receive rims and tires of different diameters.

The upper and lower supports are adapted to hold demountable rims with various kinds and styles of tires, and also tires of any type without rims.

No claim is made in the present application to the upper and lower supports and the supporting brackets, as these form the subject-matter of an application filed by me Jan. 31, 1913, serial No. 745,457.

The upper locking device comprises in its construction inner and outer vertical bars or members 25 and 26 and a top connecting bar or member 27. The inner vertical bar or member 25 is permanently and adjustably connected to the upper support at the rear side thereof by means of a confining rivet 28 or similar headed fastening device and a bolt 29, having a thumb nut 30 for clamping the inner vertical bar or member 25 in its adjustment. The rivet 28 and the bolt 29, which project horizontally from an upwardly projecting arm 31, pass through a vertical longitudinal slot 32 of the inner vertical bar or member 25, which when the thumb nut 30 of the bolt 29 is loosened, is adapted to slide upwardly and downwardly to arrange the top connecting bar or member 28 at the proper elevation in spaced relation with the upper support to provide the necessary room for the tires and rims and also for confining the same on the seats of the upper support. The fixed projecting arm or portion 31 is connected at its lower portion with a backing piece 33, which is suitably fixed to the exterior of the outer wall of the rear groove or seat of the upper support. The rivet 28 and the bolt 29 are arranged in spaced relation and prevent pivotal movement of the inner vertical bar on the support, and the rigid projecting arm or portion 31 fits against the vertical bar 25 and forms a brace for the same. The upper end of the inner or rear vertical bar 25 is provided with a rearwardly extending perforated ear or flange 34, arranged horizontally and preferably formed by bending the upper portion of the bar 25 at right angles and receiving a vertical pivot 35, piercing the inner or rear end of the horizontal top bar 27 and passing through the perforation of the ear 34. The rivet permanently pivots the top bar 27 to the upper end of the inner or rear vertical bar 25, but any other form of pivot may, of course, be employed. The inner or rear vertical bar 25 constitutes a post and the horizontal top bar 27 is adapted to be swung horizontally inwardly or rearwardly to carry it and the front vertical bar or member 26 beyond the tires and the rims to free the upper portions thereof.

The outer vertical bar or member 26, which depends from the front end of the top bar 27, is connected at its upper end therewith by a hinge joint 36, which permits the outer bar or member 26 to be swung upwardly beyond the plane of the top portions of the tires to enable the top bar to be swung rearwardly clear of the same. The bar or post 25 and the pivotal connection of the top bar 27 support the latter in a horizontal position, so that there is no pressure exerted on the upper portions of the tires. The outer vertical bar 26 constitutes a hasp member and is provided at its lower portion with a plurality of grooves or recesses 37, formed by exterior transverse ribs 38 and adapted to receive a key actuated bolt 39 of a lock 40, mounted on the exterior of the outer wall of the front groove or seat in spaced relation with an exterior lug 41 also fixed to the upper support. The outer hinged bar or hasp member 26 is adapted to swing downwardly to arrange its lower portion between the lock casing 40 and the lug 41, and it is confined in such space by the bolt 39. Any suitable construction of lock may, of course, be employed, and instead of mounting the lock on the upper support, it may, of course, be applied to the hasp member for engaging a suitable keeper of the support. The plurality of grooves or recesses 37 are arranged in a vertical series and are provided to coöperate with the adjustable connection between the rear bar 26 and the support to permit the vertical adjustment of the upper locking device. When the hasp member of the upper locking device is secured to the upper support, the tires and rims are confined in the seats or grooves of the said upper support, and they are securely locked so that it will be impossible to remove them from their seats without unlocking the hasp member.

The lower locking device includes an inner vertical bar 42, constructed similar to the bar 25 and provided with a vertical longitudinal slot 43 for the reception of a headed rivet 44, and a bolt 45 provided with a thumb nut 46 for clamping the inner vertical bar or member in its vertical adjustment.

The rivet 44 and the bolt 45 are mounted on a vertical arm or portion 47, which has a backing block or piece 48, tapered upwardly and conforming to the configuration of the adjacent wall of the lower support and presenting a vertical face to the arm 47.

The top bar or member, which extends across and fits against the lower portions of the rims 3, is composed of a relatively short rear section 49 and a relatively long front section 50, connected at its inner end to the rear section 49 by a hinge joint 51, adapted to permit the front section 50 to be swung upwardly to enable the same and the outer hasp bar or member 52 to clear the lower portions of the tires and the rims. The pivot or pintle of the hinge joint is located above the lower faces of the sections 49 and 50, which have abutting edges below the pivot or pintle of the hinge joint to limit the downward swing of the front member 50 and support the same in a horizontal position, so that the weight of the top bar or member and the hasp member will be sustained by the rear vertical bar or post. The rear section 49 is connected by a vertical pivot 53 to a rearwardly extending horizontal ear 54 of the vertical bar or post 42, and when the front section 50 is swung upwardly to arrange it and the hasp member 52 clear of the tires and rims, the said rear section 49 is adapted to be swung inwardly or rearwardly in a horizontal plane to carry the front section 50 and the hasp member 52 beyond the vertical plane of the tires and rims to release the lower portions thereof. The upper end of the hasp member 52 is connected by a hinge joint 55 with the outer end of the front section 50 of the top connecting bar or member to enable the hasp section to be swung upwardly similar to the hasp member 26 of the upper locking device.

The lower end of the hasp member 52 is provided with a plurality of grooves or recesses 56 formed by ribs 57 and adapted to be engaged by a key actuated bolt 58 of a suitable lock 59, mounted on the exterior of the outer wall of the front groove or seat of the lower support. The lower end of the hasp member is received between the lock casing and a fixed lug 60, arranged in spaced relation with the lock 59 similar to the lug 41 of the upper support. The upper and lower supports are provided at the front with backing plates or pieces 61 and 62, presenting outer vertical faces to the hasp members and carrying the locks and the lugs and conforming to the configuration of and suitably secured to the outer walls of the front grooves or seats of the upper and lower supports. The upper and lower locking devices besides securing the rims and tires on the upper and lower supports also operate to prevent the rims and tires from being jolted out of their grooves or seats.

What is claimed is:—

1. A tire holder including a tire support, a post rising from one side of the support, a top member connected at one end to the post and extending across the support in spaced relation therewith, a hasp member hinged to and depending from the other end of the top member, said hasp member being arranged to swing inwardly and outwardly to and from the support, and means for securing the lower end of the hinged hasp member to the support.

2. A tire holder including a support adapted to receive a tire, a post rising from one side of the support, a top bar or member movably connected with the said post and extending to the opposite side of the support and arranged in spaced relation with the same, said top bar or member being arranged to swing horizontally to carry it beyond the tire, a hasp member hinged to and depending from the top bar or member and carried by the latter in the horizontal movement thereof, and means for securing the lower end of the hasp member to the support.

3. A tire holder including a support adapted to receive a tire, a post arranged at one side of the support, a horizontal top member located above and in spaced relation with the support and pivotally connected at one end to the said post and adapted to swing horizontally beyond the said support, a hasp member depending from and movably connected with the other end of the top member, and locking means for securing the lower end of the hasp member to the support.

4. A tire holder including a support, a post rising from one side of the support, a top bar or member extending across the support in spaced relation therewith and connected at one end with the post, a hasp member depending from the other end of the top member and carried by the latter, means for adjustably connecting the post to the support, and locking means for securing the hasp member to the support in different adjustments of the post.

5. A tire holder including a support, a post rising from one side of the support and permanently and adjustably connected therewith to enable the post to be raised and lowered, a top bar or member connected with and carried by the post in the adjustment thereof and extending across the support in spaced relation therewith, a hasp member depending from the top bar or member, means for clamping the post in its vertical adjustment, and means for locking the hasp member to the support in different adjustments of the post.

6. A tire holder including a support having an arm or portion at one side, a vertically adjustable post provided with a vertical slot, headed fastening means mounted on the said arm or portion and extending through the slotted post and permanently connecting the latter to the said support, a bolt also mounted on the said arm or portion and extending through the slot and having a nut for clamping the post in its adjustment, a top bar or member connected with and carried by the post and extending across the support in spaced relation therewith, a hasp member connected with and depending from the top bar or member, and means for locking the hasp member to the support in different adjustments of the post.

7. A tire holder including a support, a vertically adjustable post rising from one side of the support, a top bar or member connected with and carried by the post and extending across the support in spaced relation therewith, a hasp member depending from and connected with the top bar or member and having a plurality of recesses, and a lock mounted on the support and having a bolt arranged to engage with the said recesses to secure the hasp member to the support in different adjustments of the post.

8. A tire holder including a support, a vertically adjustable post rising from one side of the support, a top bar or member connected with and carried by the post and extending across the support in spaced relation therewith, a hasp member depending from and connected with the top bar or member and having a plurality of recesses, a lock mounted on the support and having a bolt arranged to engage the recesses of the hasp member, and a fixed lug or portion carried by the support and arranged in spaced relation with the lock to form a recess for the hasp member.

9. A tire holder including a support, a post rising from one side of the support, a top bar or member connected with the post and extending across the support in spaced relation therewith, a hasp member depending from the top member and having its lower end arranged at one side of the support and provided at its outer face with a plurality of horizontal ribs forming recesses, a fixed lug carried by the support and arranged at one edge of the hasp member, and a lock mounted on the support at the other edge of the hasp member and provided with a bolt adapted to engage the said recesses.

10. A tire holder including a support, a post rising from one side of the support, a top member connected at one end to the post and composed of two sections hinged together, a hasp member carried by the other end of the top member, and means for securing the hasp member to the support.

11. A tire holder including a support, a post rising from one side of the support, a top member pivoted at one end to the post and arranged to swing horizontally, said top member extending across the support in spaced relation therewith and composed of two hinged sections, a hasp member depending from the top member, and means for securing the top member to the support.

12. A tire holder including upper and lower supports and upper and lower locking devices for the supports, each locking device comprising a rear post, a top bar or member extending forwardly from the rear post, a front hasp member hinged to and depending from the top member, said hasp member being arranged to swing inwardly and outwardly to and from the co-acting support, and locking means for securing the hasp member to the support.

In testimony, that I claim the foregoing as my own, I have hereto affixed my signature in the presence of two witnesses.

FRANKLIN C. MILLER.

Witnesses:
  RUSSELL D. WELCH,
  S. S. HORN.